June 8, 1954  S. D. POOL ET AL  2,680,624
TANK MOUNTING FOR TRACTORS
Filed July 13, 1949

Inventors
Stuart D. Pool
Bernise J. Shager
Paul O. Pippel
Atty

Patented June 8, 1954

2,680,624

UNITED STATES PATENT OFFICE 2,680,624

TANK MOUNTING FOR TRACTORS

Stuart D. Pool and Bernise J. Shager, Moline, Ill., assignors to International Harvester Company, a corporation of New Jersey Application July 13, 1949, Serial No. 104,546

6 Claims. (Cl. 280—5)

This invention relates to mobile plant and soil treating mechanisms and particularly to tractor mounted receptacles for dispensing treating material. More specifically, the invention concerns a universal mounting means for supporting a tank or other container upon a tractor.

In recent years it has become the practice among farmers, particularly in certain localities, to dispense fertilizer to the soil in the form of liquids and gases and to fumigate plants as well as to cultivate them by the application of weed killing liquids and the like. The present invention was designed particularly for mounting containers such as cylindrical tanks upon a tractor and the replacement thereof with a minimum of effort. The principal object of the invention is to provide improved mechanism for mounting a tank upon a tractor and for supporting it thereon.

Another important object of the invention is to provide, in mechanism for mounting a tank upon a tractor, means in the mounting mechanism accommodating longitudinal movement of the tank relative to the tractor in order to distribute the weight thereof as desired.

Another object of the invention is to provide mechanism for mounting upon a tractor, tanks of varying diameter.

A further object of the invention is to provide a generally parallel link arrangement for mounting upon a tractor a tank containing soil or plant treating material wherein the links may be relatively moved to change the vertical spacing therebetween and thus affect the shifting of the tank which is supported thereby to accommodate different types of rear mounted earth working tools.

Other objects and advantages of the invention will become clear from the following detailed description when read in conjunction with the accompanying drawings, wherein.

Figure 1:
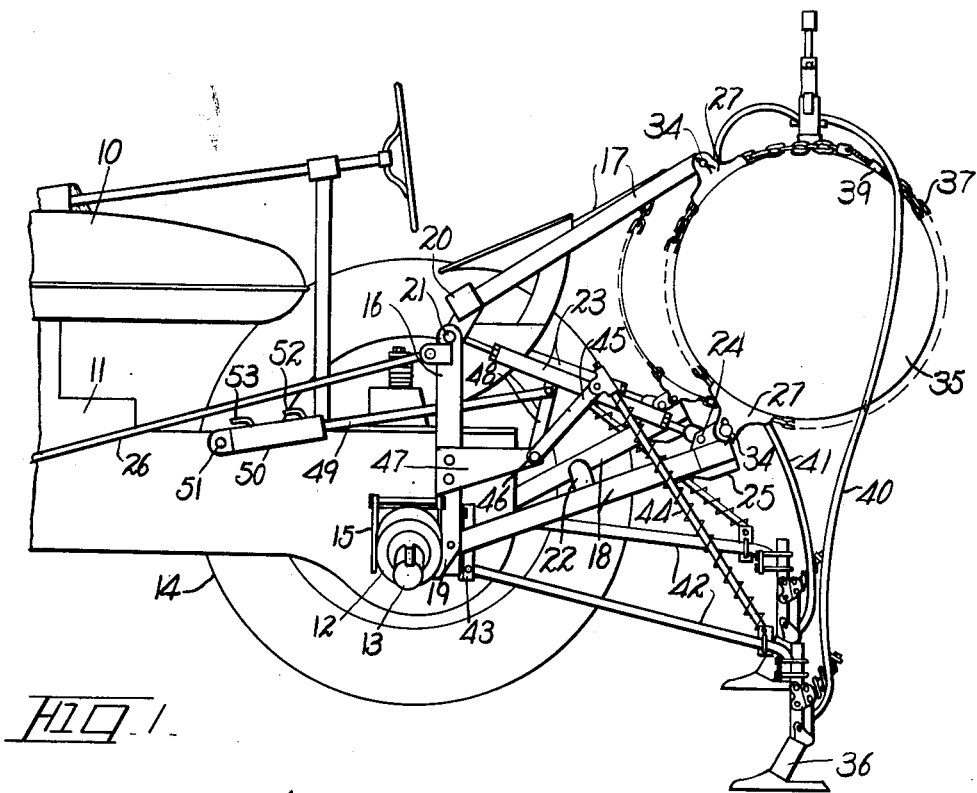
Fig. 1 is a view in side elevation of the rear end of a tractor showing a cylindrical tank mounted thereupon by mechanism embodying the features of the present invention.

Referring to the drawings, the tractor upon which the treating tank with which the present invention is concerned is mounted is designated by the numeral 10 and is provided with a longitudinally extending body 11 including a conventional power plant, and a rear axle structure 12 in which is journaled a transverse axle 13 upon which is mounted laterally spaced drive wheels 14, only one of which is shown.

The rear axle structure 12 has secured thereto by clamps 15 a vertically extending bracket structure 16. A similar clamp 15 and bracket structure 16 is provided upon the rear axle of the tractor at opposite sides of the body 11 thereof although only one such a bracket is visible in the drawings.

A pair of vertically spaced upper and lower generally parallel links 17 and 18 respectively are provided for attachment to each of the brackets 16 at the opposite sides of the tractor body. Each of the links 17 and 18 is in the form of a pipe and the lower link 18 has its forward end pivotally connected at 19 to the lower portion of the bracket 16. Upper link 17 has secured to the forward end thereof an extension member 20 pivotally connected at 21 to the upper end of the bracket 16. The lower links 18 on opposite sides of the tractor body are preferably braced and connected by a cross piece 22. Likewise pivotally connected at 21 to the upper end of each bracket 16 is an extensible member in the form of a turnbuckle 23, the other end of which extends diagonally downwardly and rearwardly and is pivotally connected at 24 to an extension member 25 provided at the rearwardly extending free end of link 18. Bracket 16 is provided with additional bracing in the form of a rod 26 secured to the upper end of the bracket and extending forwardly to a suitable point of anchorage, not shown, upon the side of the tractor.

Figure 2:
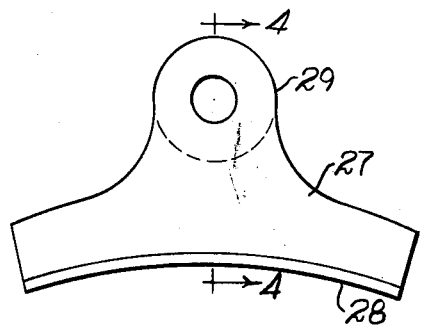
Fig. 2 is an enlarged elevation of the clamping structure by which the supporting links are connected to the tank.
Figure 4:
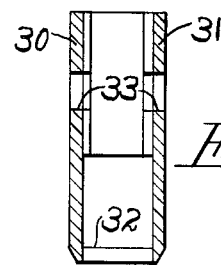
Fig. 4 is a section taken on the line 4—4 of Fig. 2.

To each extension member 25 and to the rear end of each link 17 is pivotally connected a clamp 27. Each of these clamps is a substantial duplicate of the other and its structure is shown clearly in Figs. 2 to 4. Clamp 27 is generally triangular in shape having an arcuate base portion 28 and a boss portion 29. The clamp comprises laterally spaced members 30 and 31 connected at the base by cross piece 32 and the side pieces 30 and 31 are apertured as at 33 to receive a pivot pin 34.

Figure 3:
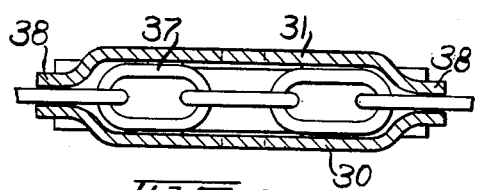
Fig. 3 is a plan view in section of the structure shown in Fig. 2.

The base 28 of clamp 27 is made arcuate to conform generally to the periphery of transversely extending tank 35 adapted to contain soil treating liquids such as anhydrous ammonia to be applied by specially designed applicators 36 as a fertilizer. Tank 35 extends transversely of the tractor rearwardly thereof, is cylindrical in shape and is surrounded at each end by a chain 37, the links of which are received between the walls 30 and 31 of the clamp 27 in the manner indicated clearly in Fig. 3. In Fig. 3 is will be observed that each end of the clamp 27 is restricted as at 38 so that the slot or space formed between the ends of the walls 30 and 31 is adapted to receive in upright position a length of the chain 37. The right angle links of the chain 37 are received in the broadened space between the walls 30 and 31 of the clamp. The ends of the chain are connected by a turnbuckle 39 by which the chain may be tightened as dictated by the circumference of the tank 35.

The clamps 27 of the vertically spaced pairs of links on each side of the tractor body are secured to the chain 37 at circumferentially spaced locations about the periphery of tank 35. The circumferential spacing between the clamps 27 of a pair of vertically spaced links may be varied and therefore the vertical spacing between the links 17 and 18 may be varied by swinging the links 17 and 18 about their pivots 21 and 19 respectively. Link 17 is free to pivot about its connection to the bracket 16. The lower links 18, however, are rigidly held by the connection thereto of the turnbuckle 23 and may be swung about their pivots 19 by adjusting the length of the members 23. By adjusting the number of links of the chain 37 between the clamps 27 at one end of the tank 35 the weight of the tank may be shifted forwardly or rearwardly with respect to the tractor a distance substantially equal to the radius of the tank.

In the form of the invention shown in the drawings treating material is supplied from the tank 35 through hose lines 40 and 41 to the applicators or shovels 36. These applicators 36 are pivotally connected by drag links 42 to a bracket 43 secured to the rear axle housing of the tractor at each side of the body thereof. These drag links 42 carrying the applicators 36 are raised and lowered with respect to the tractor by mechanism including a connecting rod 44 connected between the cultivator applicator and an arm 45 mounted upon a rock shaft 46 extending transversely of the tractor and rotatably mounted in brackets 47 secured to the brackets 16 at each side of the tractor. Likewise mounted upon the shaft 46 is an arm 48 connected to a piston rod 49 slidable in a hydraulic cylinder 50 pivotally mounted at 51 upon the side of the tractor. The cylinder 50 is operated in a conventional manner by fluid under pressure supplied thereto through connections 52 and 53 on the cylinder.

It should readily be understood that a novel mounting means has been provided for carrying agricultural treating tanks and the like upon a tractor. The tank 35 is readily replaced with a similar tank of different diameter or with another tank containing different treating material, preferably by releasing the turnbuckle 23 to allow the supporting link members 17 and 18 to drop downwardly. The chains are then removed and secured about the ends of the new tank. An ordinary hand jack may be utilized to raise the tank and its supporting members until the turnbuckle can be replaced.

Having described the invention, it should be clearly understood that modifications may be made therein without departing from the spirit of the invention or the scope of the appended claims.

What is claimed is:

1. A supporting structure for mounting a cylindrical storage tank on a tractor comprising laterally spaced pairs of vertically spaced links pivotally connected at their forward ends to the tractor for vertical swinging and extending rearwardly therefrom, at least one link of each said pair of links being vertically adjustable about its pivot relative to the other, an annular member for each pair of links adapted to encircle the tank and means for adjustably and selectively securing the ends of said links to said annular member at vertically and circumferentially spaced locations thereon, whereby the longitudinal position of the tank relative to the tractor may be varied.

2. A supporting structure for mounting a cylindrical storage tank on a tractor comprising laterally spaced pairs of vertically spaced links pivotally connected at their forward ends to the tractor for vertical swinging and extending rearwardly therefrom, the upper of said links being vertically adjustable about its pivot relative to the lower links, a brace adjustable in length connecting the tractor and the rear end of the lower of each pair of links to render the latter rigid, an annular member for each pair of links adapted to encircle the tank and means for adjustably and selectively securing the ends of said links to said annular member at vertically and circumferentially spaced locations thereon, whereby the longitudinal position of the tank relative to the tractor may be varied.

3. A supporting structure for mounting a cylindrical storage tank on a tractor comprising laterally spaced pairs of vertically spaced links pivotally connected at their forward ends to the tractor for vertical swinging and extending rearwardly therefrom, at least one link of each said pair of links being vertically adjustable about its pivot relative to the other, a flexible member for each pair of links adapted to encircle the tank and means for adjustably and selectively securing the ends of said links to said annular member at vertically and circumferentially spaced locations thereon, whereby the longitudinal position of the tank relative to the tractor may be varied.

4. A supporting structure for a receptacle extending transversely of the tractor comprising laterally spaced pairs of vertically spaced links pivotally connected at one end to the tractor for vertical swinging movement and with the free ends projecting longitudinally therefrom, at least one link of each said pair of links being vertically adjustable about its pivot relative to the other, clamping means carried at the free end of each link, and an annular flexible member carried between the clamps of each pair of links adapted to surround the receptacle at laterally spaced locations thereon corresponding to the spacing between said pairs of links, said clamping means being adjustable on said annular member to vary the vertical spacing between said pairs of links, and a brace adjustable in length pivotally connected to the tractor and to the free end of one link of each said pair of links to render the latter rigid.

5. Mechanism for supporting upon a tractor a cylindrical tank for dispensing soil and plant treating material comprising laterally spaced vertically extending brackets secured to the rear of the tractor, a pair of vertical spaced links pivotally connected at one end to each of said brackets for vertical swinging movement and extending rearwardly therefrom, at least one link of each said pair of links being vertically adjustable about its pivot relative to the other, a member adjustable in length connected between the respective bracket and the lower of said pairs of links to render the latter rigid, said member being adjustable to swing the lower of said links about their pivots, means accommodating longitudinal adjustment of the tank with respect to the tractor comprising an annular member removably secured about the periphery of the tank at each end thereof, and clamping means carried by the links of each pair and adapted to be secured to the associated annular member at circumferentially spaced locations thereon.

6. A support for a cylindrical tank adapted to be mounted upon a tractor or the like comprising a supporting structure pivoted at its forward end to the tractor for generally vertical swinging movement and extending rearwardly therefrom, clamping means pivotally mounted on said supporting structure at laterally spaced locations, an extensible brace connected between the tractor and the rearwardly extending end of said supporting structure to render the latter rigid, link means vertically spaced from and generally parallel to said supporting structure pivoted at one end to the tractor for generally vertical swinging movement, clamping means pivoted to the end of said link means, and means arranged around the tank cooperable with said clamping means to secure the latter thereto, said supporting structure and said link means being selectively adjustable to vary the vertical spacing therebetween and therefore the circumferential spacing between the clamping means.

References Cited in the file of this patent

UNITED STATES PATENTS

| Number | Name | Date |
|---|---|---|
| 481,640 | Rettig | Aug. 30, 1892 |
| 1,871,529 | Karshner | Aug. 16, 1932 |
| 2,391,027 | McLemore et al. | Dec. 18, 1945 |
| 2,523,953 | Johnson | Sept. 26, 1950 |